Aug. 6, 1963          C. L. LODJIC ETAL          3,099,847
             TRACK MOUNTED TELESCOPING LOADING
             AND UNLOADING RAMP FOR AIRCRAFT
Filed June 20, 1960                          4 Sheets-Sheet 1

INVENTORS
CARL L. LODJIC,
ROBERT D. LICHTI
BY THEIR ATTORNEYS
HARRIS, KIECH, RUSSELL & KERN

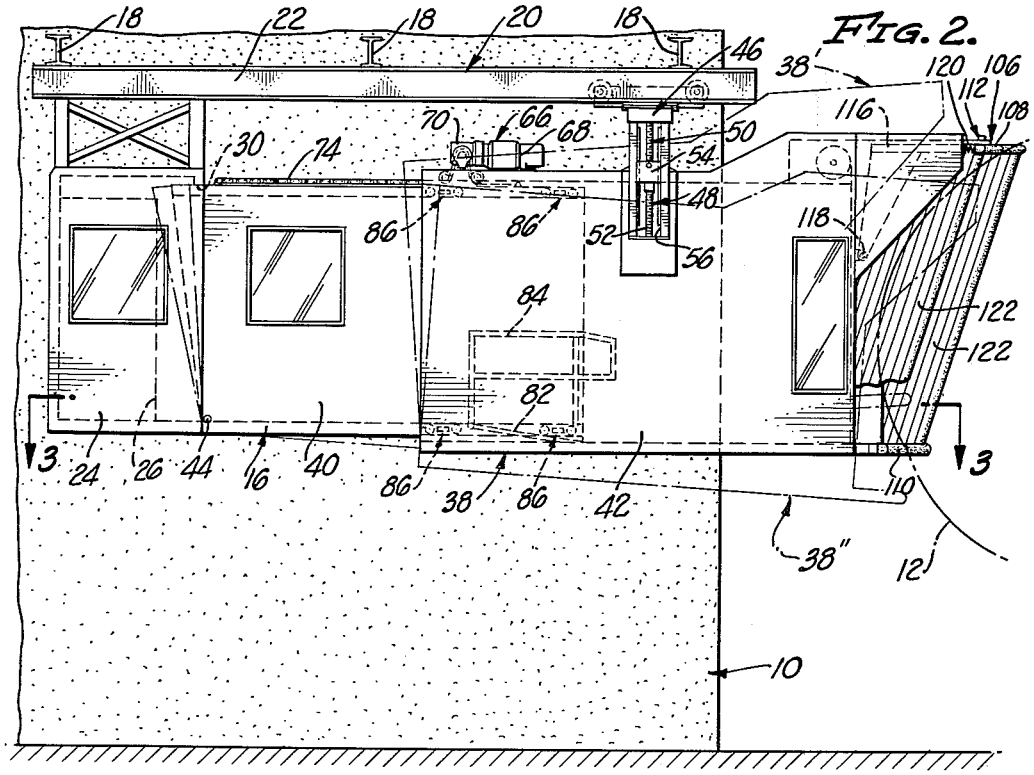
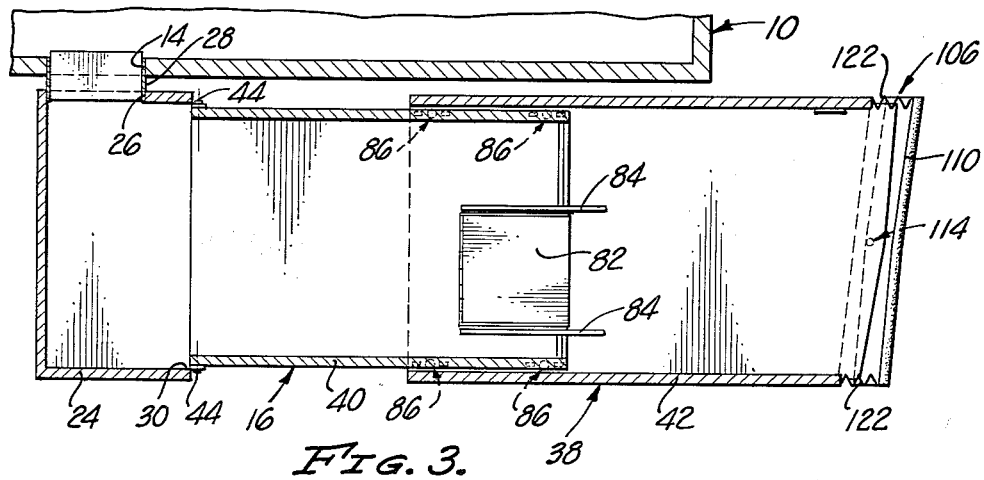

INVENTORS
CARL L. LODJIC,
ROBERT D. LICHTI
BY THEIR ATTORNEYS
HARRIS, KIECH, RUSSELL & KERN

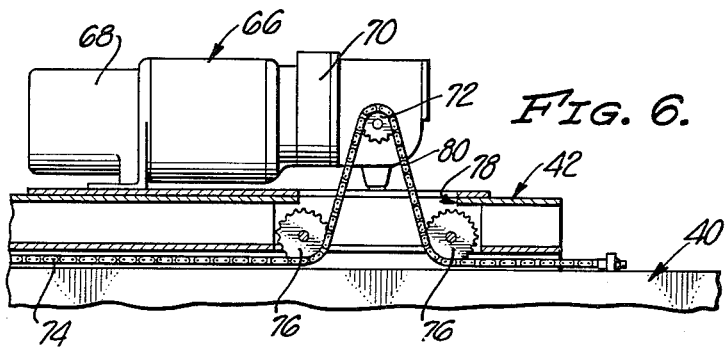
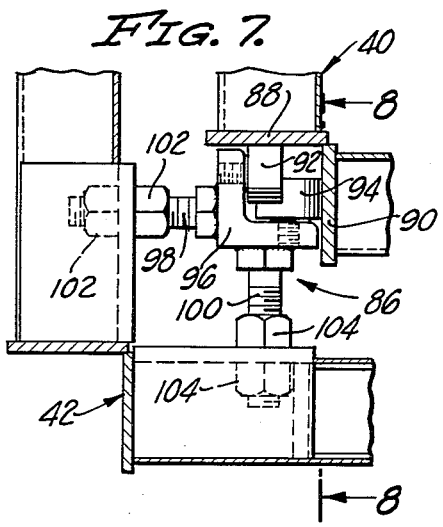
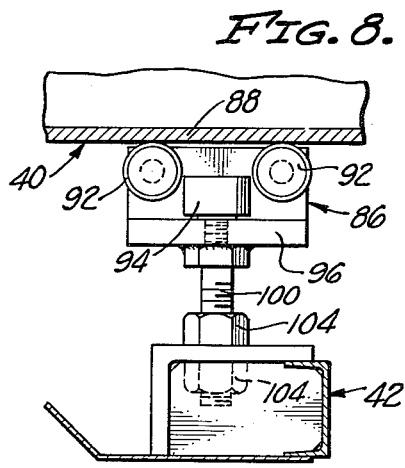
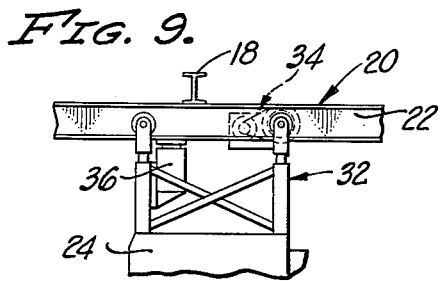
INVENTORS
CARL L. LODJIC,
ROBERT D. LICHTI
BY THEIR ATTORNEYS
HARRIS, KIECH, RUSSELL & KERN

United States Patent Office 3,099,847
Patented Aug. 6, 1963

3,099,847
TRACK MOUNTED TELESCOPING LOADING AND
UNLOADING RAMP FOR AIRCRAFT
Carl L. Lodjic and Robert D. Lichti, Long Beach, Calif.,
assignors, by mesne assignments, to Stanray Corporation, Chicago, Ill., a corporation of Delaware
Filed June 20, 1960, Ser. No. 37,174
7 Claims. (Cl. 14—71)

The present invention relates to a telescoping loading and unloading ramp for airplanes, or other vehicles, and a general object is to provide a more or less horizontal telescoping ramp which is located approximately at fuselage level so that embarking and debarking passengers negotiate a more or less horizontal path, and which is supported entirely from above so that the space therebeneath is clear for the passage of baggage trucks, or other equipment.

More particularly, an object of the invention is to provide a telescoping ramp which includes overhead track means, a passageway below the level of the track means and including a doorway facing in the direction of the track means, telescoping ramp means communicating at its inner end with the doorway in the passageway and having an outer end which is adapted to register with a doorway in an airplane fuselage, and means for extending and contracting the telescoping ramp means and for pivoting it upwardly and downwardly relative to the passageway so as to bring the outer end of such ramp means into engagement with an airplane fuselage around a doorway therein, whereby passengers may embark and debark by walking through the telescoping ramp means from one of the doorways mentioned to the other.

A more specific object of the invention is to provide horizontal pivot means extending transversely of the track means adjacent the bottom of the doorway in the passageway and pivotally connecting the inner end of the telescoping ramp means to the passageway, whereby the ramp means may pivot upwardly and downwardly about the axis of such pivot means to raise and lower the outer end of the ramp means into horizontal alignment with the doorway in the airplane fuselage.

Another object is to provide a telescoping ramp means which includes an inner tunnel pivotally connected to the aforementioned passageway in the manner set forth and which includes an outer tunnel telescoped over the inner tunnel and engageable at its outer end with the airplane fuselage around the doorway therein.

A further object is to provide a suspension means for the telescoping ramp means which engages and is movable along the track means and which is connected to the outer tunnel, whereby the outer tunnel may be moved toward and away from the aforementioned passageway to contract and extend the ramp means.

Still another object is to provide a construction wherein the suspension means for the telescoping ramp means incorporates an elevating means for pivoting the ramp means upwardly and downwardly about the axis of the pivot means set forth so as to raise and lower the outer end of the outer tunnel.

Yet another object is to provide drive means interconnecting the tunnels for telescopically moving the outer tunnel relative to the inner tunnel toward and away from the passageway mentioned.

The invention has as another object the provision of a construction wherein the passageway to which the telescoping ramp means is pivotally connected may either be stationary, or movable along the track means to permit retraction of the entire ramp into an inoperative position remote from its operating position.

A further object is to provide flexible and resilient bumper means on the outer end of the outer tunnel for engagement with the airplane fuselage around the doorway therein in a substantially weathertight manner.

More particularly, an object is to provide a bumper means which includes pivoted upper and lower bumper elements adapted to accommodate themselves to the contour of the airplane fuselage above and below the doorway therein, and flexible side curtains adapted to accommodate themselves to the contour of the airplane fuselage at the sides of the doorway therein.

The foregoing objects, advantages, features and results of the present invention, together with various other objects, advantages, features and results thereof which will be evident to those skilled in the art to which the invention relates, may be attained with the exemplary embodiments of the invention described in detail hereinafter and illustrated in the accompanying drawings, in which:

FIG. 2 is a side elevational view of the loading and unloading ramp of the invention with a telescoping ramp means thereof in extended condition;

FIG. 3 is a horizontal sectional view taken along the arrowed line 3—3 of FIG. 2;

FIG. 6 is an enlarged, fragmentary sectional view taken along the arrowed line 6—6 of FIG. 5;

FIG. 7 is an enlarged, fragmentary sectional view taken along either of the arrowed lines 7—7 of FIG. 4;

FIG. 8 is a sectional view taken along the arrowed line 8—8 of FIG. 7; and

FIG. 9 is a fragmentary side elevational view similar to a portion of FIG. 2, but illustrating an alternative embodiment of the invention.

Figure 1:
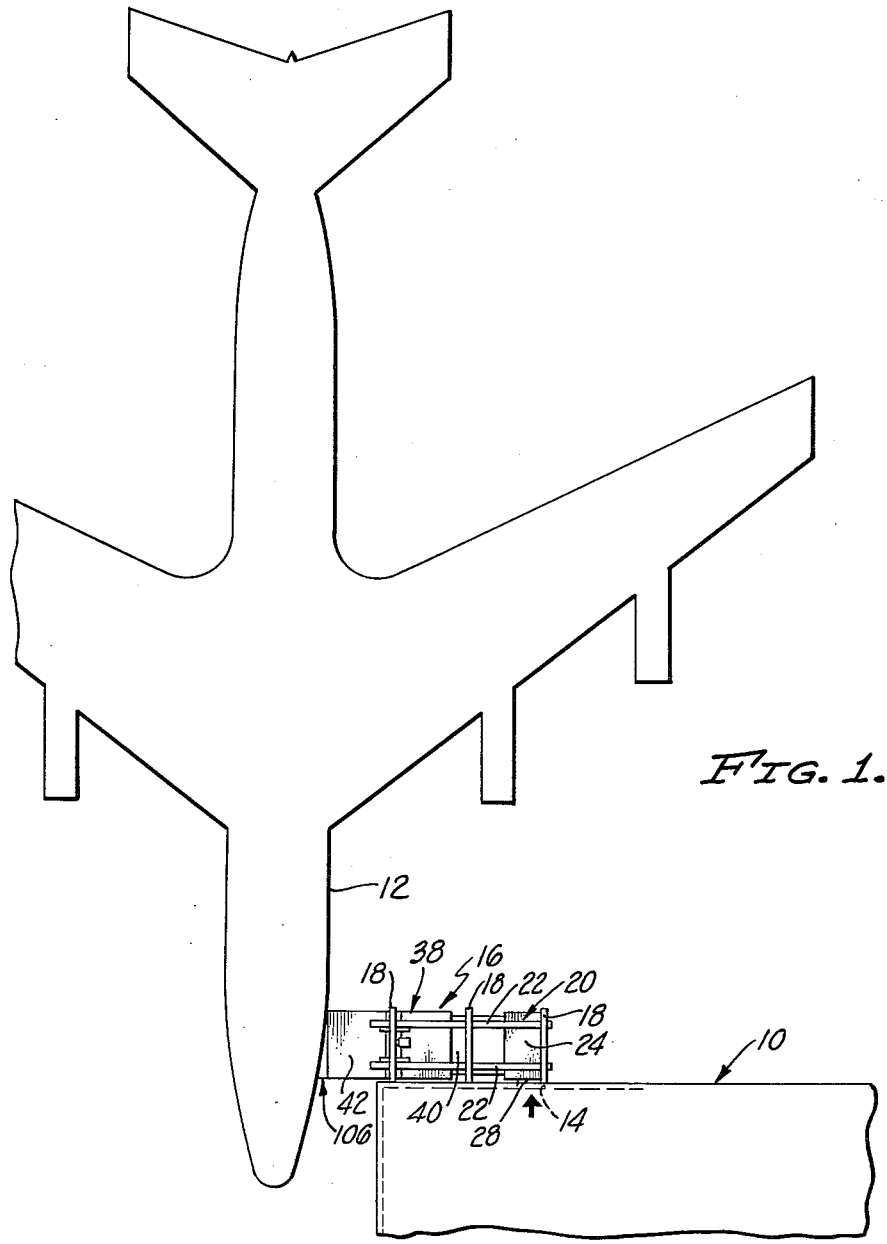
FIG. 1 is a bird's eye view of an airplane loading and unloading area in which a telescoping loading and unloading ramp of the invention has been installed.

Referring first to FIG. 1 of the drawings, the numeral 10 designates an airport terminal building adjacent which is parked an airplane 12 to be loaded or unloaded. The airplane 12 is provided adjacent its nose with a passenger doorway, not shown, and the building 10 is provided with a doorway 14, FIG. 3, on the second floor of such building so that the doorway in the airplane and the doorway 14 are at more or less the same elevation. It will be understood that while the numeral 10 is regarded herein as denoting an airport terminal building, it may be any suitable elevated structure, such as an elevated walkway communicating with the second floor of an airport terminal building.

The space between the doorway in the airplane 12 and the doorway 14 in the building 10 is adapted to be bridged by a loading and unloading ramp 16 which utilizes the building 10 as a supporting structure and which is elevated above ground level so that the space therebeneath is available for the passage of baggage trucks, or the like. In the particular construction illustrated, the building 10 is provided with overhanging, cantilevered beams 18 on which the ramp 16 of the invention is mounted.

Considering the ramp 16 in more detail, it includes an overhead track means 20 comprising two tracks or rails 22 located below and suitably secured to the cantilevered beams 18. The rails 22, which are shown as simple I-beams, are parallel to and spaced outwardly from the side of the building 10 from which the cantilevered beams 18 project.

Suspended from the rails 22 is a cab-like passageway 24 which forms part of the ramp 16. As shown in FIG. 3, the passageway 24 includes a doorway 26 which is connected to the doorway 14 in the building 10 by a short enclosed walkway 28. The passageway 24 also provides a doorway 30 which faces in the direction of the track means 20.

In the construction illustrated in FIGS. 1 to 4 of the drawings, the passageway 24 is rigidly connected to the rails 22 and is thus fixed in position relative thereto. However, as shown in FIG. 9 of the drawings, the rails 22 may be lengthened and the passageway 24 may be connected thereto by a wheeled suspension means 32 engaging and movable along the rails 22. With this construction, the entire ramp 16 may be retracted along the rails 22 into an inoperative position remote from the operating position thereof, i.e., an inoperative position located partially or entirely to the right of the doorway 14, as viewed in FIG. 1 of the drawings, it being necessary under such conditions to disengage the walkway 28 from the doorway 14. The ramp 16 may be moved bodily between its inoperative and operating positions by a drive means 34 connected to one or more of the wheels of the wheeled suspension means 32. A suitable brake means 36 on the wheeled suspension means 32 and engageable with one of the rails 22 may be provided to lock the ramp 16 in any desired position on the track means 20.

Figure 4:
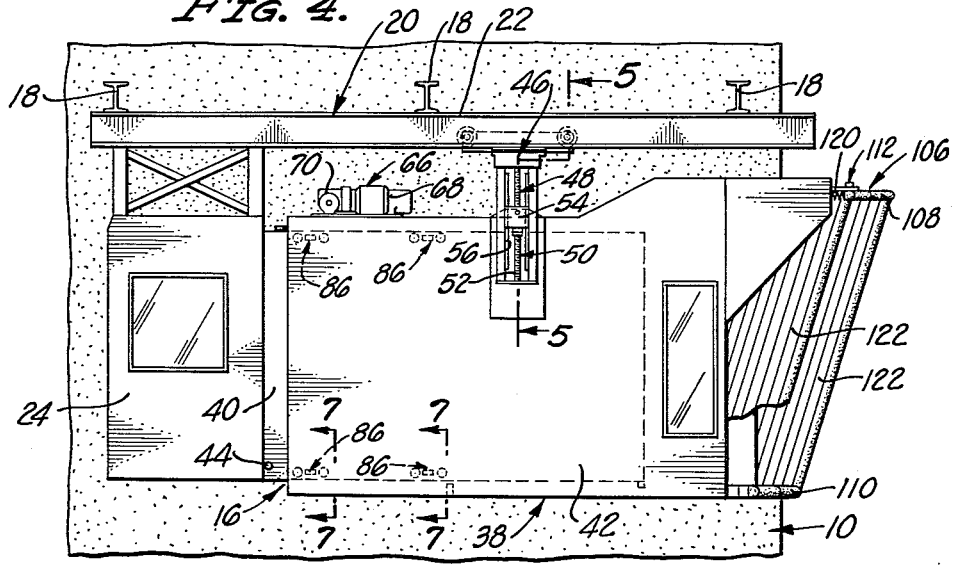
FIG. 4 is a view similar to FIG. 2, but showing the telescoping ramp means in contracted condition.

Referring particularly to FIGS. 2 to 4 of the drawings, the ramp 16 includes a telescoping ramp means 38 comprising an inner tunnel 40 and an outer tunnel 42 telescoped over and movable longitudinally of the inner tunnel. The inner end of the inner tunnel 40 registers with the doorway 30 and projects through such doorway into the passageway 24 and is pivotally connected to the passageway 24 by a horizontal pivot means 44 extending transversely of the track means 20 adjacent the bottom of the doorway 30. With this construction, the entire ramp means 38 may be pivoted upwardly and downwardly about the axis of the pivot means 44 to register the outer end of the outer tunnel 42 with the doorway in the fuselage of the airplane 12. The uppermost and lowermost positions of the ramp means 38 are designated by the numerals 38' and 38", respectively, in FIG. 2 of the drawings. The inner end of the inner tunnel 40 is suitably sealed, in a manner not shown, relative to the passageway 24 to provide a weathertight connection despite upward and downward pivoting of the ramp means 38.

The ramp means 38 is suspended from the track means 20 by a wheeled suspension means 46 the lower end of which is connected to the outer tunnel 42 and the upper end of which engages and is rollable along the rails 22 so as to extend or contract the ramp means 38 to move the outer end of the outer tunnel 42 into or out of engagement with the fuselage of the airplane 12. Preferably, the suspension means 46 is connected to the outer tunnel 42 intermediate the ends thereof so that the weight of the outer end of the outer tunnel at least approximately balances the weight of the inner end thereof, thereby minimizing any tendency of the hereinafter-described telescoping connection between the inner tunnel 40 and the outer tunnel to bind.

Incorporated in the suspension means 46 is an elevating means 48 for pivoting the entire ramp means 38 upwardly and downwardly about the axis of the pivot means 44 so as to raise and lower the outer end of the outer tunnel 42 as required to register it with the doorway in the fuselage of the airplane 12. The elevating means 48 is shown as including two screw means 50 respectively connected to opposite sides of the outer tunnel 42. Each screw means 50 is shown as comprising a simple screw 52 carried by the suspension means 46 and threaded through a nut 54 connected to the outer tunnel 42, the supension means providing a vertical track 56, best shown in FIGS. 2 and 4, for each nut 54. Preferably, however, the two screw means 50 are ball screw means to minimize friction, instead of comprising the simple threaded screws 52 and simple threaded nuts 54 shown.

Figure 5:
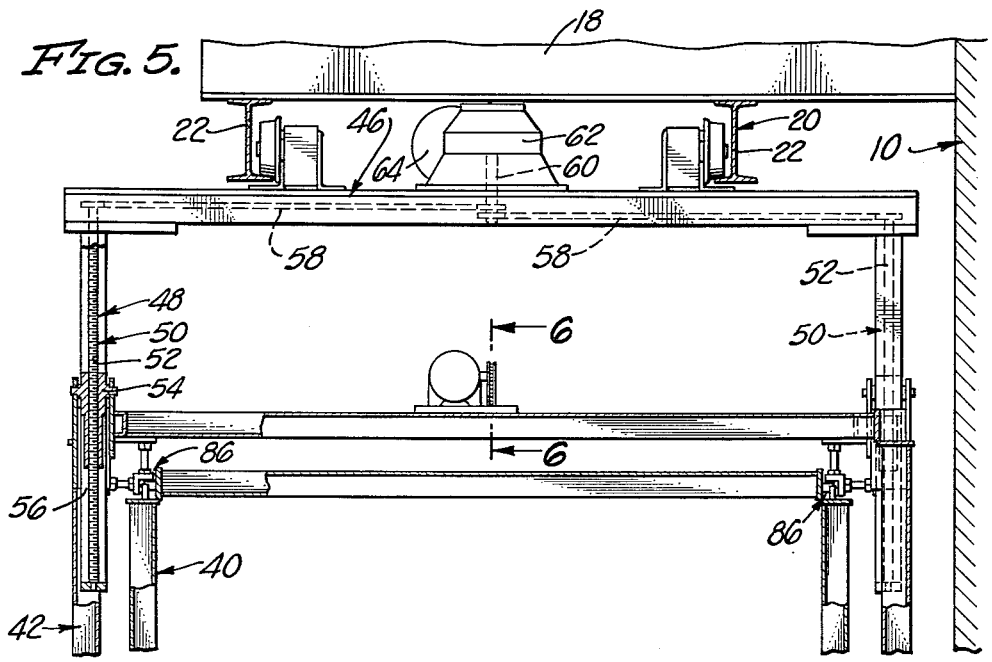
FIG. 5 is an enlarged, fragmentary sectional view taken along the arrowed line 5—5 of FIG. 4.

As shown in FIG. 5 of the drawings, the two screws 52 are driven by chains 58 trained around sprockets thereon and around sprockets on an output shaft 60 of a speed reducing unit 62 mounted on the suspension means 46. The input shaft, not shown, of the unit 62 is driven by a reversible motor 64. As will be apparent, the motor 64 may be operated in either direction to cause the screw means 50 to raise or lower the outer end of the ramp means 38 as required to register it with the doorway in the airplane fuselage.

The ramp means 38 may be extended and contracted by providing the wheeled suspension means 46 with a drive means, not shown, similar to the drive means shown in FIG. 9 of the drawings in conjunction with the suspension means 32 for the alternative embodiment illustrated therein. Preferably, however, the ramp means 38 is extended and contracted by a drive means 66 which directly interconnects the inner and outer tunnels 40 and 42. More particularly, the drive means 66 includes a reversible motor 68 carried by the outer tunnel 42 and driving, through a speed reducing unit 70, a sprocket 72 carried by the outer tunnel. As shown in FIGS. 2 and 4, and as best shown in FIG. 6, the sprocket 72, which constitutes a driving member, engages a driven member in the form of a chain 74 paralleling the track means 20 and connected at its ends to the inner tunnel 40 adjacent the respective ends thereof. The chain 74 is trained around two idler sprockets 76 on the outer tunnel 42 and extends outwardly through an opening 78 in the outer tunnel to form a loop 80 which is trained around the driving sprocket 72. With this construction, the driving sprocket 72 in effect walks along the chain 74 in one direction or the other, depending on the direction of rotation of the motor 68, to extend or contract the ramp means 38.

As best shown in FIG. 3, the floor of the inner tunnel 40 terminates adjacent the outer end of the inner tunnel in a pivoted apron 82 which is slidable on the floor of the outer tunnel 42 as the ramp means 38 is extended and contracted. As will be apparent, debarking and embarking passengers respectively walk up and down the apron 82 in walking through the ramp means 38. Preferably, handrails 84 are provided alongside the apron 82. While the apron 82 is shown as occupying only a portion of the width of the ramp means 38, it will be understood that it may be widened to occupy substantially the entire width of the inner tunnel 40 if desired.

As suggested in FIGS. 2 and 4 of the drawings, the inner and outer tunnels 40 and 42 are telescopically interconnected by four roller assemblies 86 on each side of the ramp means 38, there being a total of eight such roller assemblies. More particularly, there are two of the roller assemblies 86 arranged in longitudinally spaced relation adjacent each corner of the ramp means 38. One of the roller assemblies 86 is shown in detail in FIGS. 7 and 8 of the drawings and will be described with reference thereto.

The inner tunnel 40 is provided at each corner with a horizontal track 88 and a vertical track 90 arranged perpendicularly. The two roller assemblies 86 at each corner of the ramp means 38 engage the corresponding horizontal and vertical tracks 88 and 90, each roller assembly 86 including two vertical rollers 92 engaging the horizontal track 88 and a horizontal roller 94 located midway between the vertical rollers 92 and engaging the vertical track 90. The two vertical rollers 92 and the horizontal roller 94 are rotatably mounted on a support 96 which is connected to the corresponding side of the outer tunnel 42 by a horizontal bolt 98 and to the bottom or floor of the outer tunnel by a vertical bolt 100. The axis of the horizontal bolt 98 lies substantially in the plane of the horizontal roller 94, while the axis of the vertical bolt 100 lies substantially in the plane of the vertical rollers 92. The bolts 98 and 100 are secured to the side and floor, respectively, of the outer tunnel 42 by paired nuts 102 and 104, respectively. The nuts 102 clamp the corresponding side of the outer tunnel 42 therebetween, while the nuts 104 clamp the bottom or floor thereof therebetween. As will be apparent, the nuts 102 and 104 may be adjusted relative to the respective bolts 98 and 100 to bring the rollers 92 and 94 firmly into engagement with the respective tracks 88 and 90, such adjustments being possible with each of the eight roller assemblies 86. The result is an extremely rigid interconnection between the inner and outer tunnels 40 and 42 with respect to both bending and torque. This feature is more fully described and claimed in the copending patent application of Robert D. Lichti, one of the inventors herein, filed August 5, 1960, Serial No. 47,704, now abandoned.

The outer tunnel 42 is provided at its outer end with a flexible and resilient bumper means 106 engageable with the side of the fuselage of the airplane 12 around the doorway therein in a substantially weathertight manner. The bumper means 106 includes upper and lower bumper elements 108 and 110, preferably edged with elastomeric material, which are engageable with the fuselage above and below the doorway and which are universally connected to the outer tunnel 42 for pivotal movement about both vertical axes and horizontal axes extending longitudinally of the ramp 16. Such universal pivotal connections for the upper and lower bumper elements 108 and 110 are diagrammatically shown and are designated generally by the numerals 112 and 114, respectively. Thus, the bumper elements 108 and 110 are capable of adapting themselves to variations in fuselage contour, variations in the position of the airplane 12 relative to the ramp 16, and the like.

To permit the upper bumper element 108 to accommodate variations in cross sectional fuselage curvature above the doorway, this bumper element is bodily movable longitudinally of the ramp 16 by mounting it through the connection 112, on a mounting member 116 which, in turn, is mounted on the outer tunnel 42 by a horizontal pivot means 118 the axis of which extends transversely of the ramp 16. As will be apparent, since the pivot means 118 is located at a level below the upper bumper element 108, this bumper element can move upwardly and downwardly, as well as inwardly and outwardly, in response to pivoting of the mounting member 116, to accommodate virtually any fuselage cross sectional curvature above the doorway. To permit the hereinbefore-described universal pivoting of the upper bumper element 108 relative to the mounting member 116, the inner edge of the bumper element 108 is spaced from a corresponding edge of the mounting member 116, and this gap is filled by a flexible corrugated sheet 120 for weatherproofing purposes.

The bumper means 106 also includes flexible and resilient, corrugated side curtains 122, preferably formed of an elastomeric material, which are engageable with the fuselage of the airplane 12 at the sides of the doorway and which are adapted to conform to the contour of the fuselage. These side curtains are connected at their upper and lower ends and along their inner edges to the outer tunnel 42, and are also connected at their upper and lower ends to the upper and lower bumper elements 108 and 110. Thus, complete weatherproofing at the sides of the outer end of the outer tunnel 42 is provided.

The bumper means 106 is somewhat similar to that disclosed and claimed in the co-pending application of Robert D. Lichti, one of the inventors herein, filed August 5, 1960, Serial No. 47,702, now abandoned.

Although exemplary embodiments of the invention have been disclosed herein for purposes of illustration, it will be understood that various changes, modifications and substitutions may be incorporated in such embodiments without departing from the spirit of the invention as defined by the claims which follow.

We claim:

1. In a track mounted, telescoping loading and unloading ramp, the combination of: supporting means including overhead track means; a passageway carried by said supporting means below the level of said track means and including a first doorway facing in the direction of said track means, said passageway including a second doorway adapted to register with a doorway in a terminal building, or the like; telescoping ramp means below said track means and including an inner tunnel and an outer tunnel telescoped over said inner tunnel, said inner tunnel having an inner end in register with said first doorway; horizontal pivot means extending transversely of said track means adjacent the bottom of said first doorway and pivotally connecting said inner end of said inner tunnel to said passageway, whereby said ramp means may pivot upwardly and downwardly about the axis of said pivot means; wheeled suspension means for said ramp means engaging and movable along said track means and connected to said outer tunnel; drive means for telescopically moving said outer tunnel relative to said inner tunnel toward and away from said passageway; and elevating means incorporated in said suspension means for pivoting said ramp means upwardly and downwardly about the axis of said pivot means.

2. In a track mounted, telescoping loading and unloading ramp, the combination of: a supporting structure; overhead track means carried by said supporting structure; a passageway suspended from said track means and including a first doorway facing in the direction of said track means, said passageway including a second doorway adapted to register with a doorway in a terminal building, or the like; telescoping ramp means below said track means and including an inner tunnel and an outer tunnel telescoped over said inner tunnel, said inner tunnel having an inner end in register with said first doorway; horizontal pivot means extending transversely of said track means adjacent the bottom of said first doorway and pivotally connecting said inner end of said inner tunnel to said passageway, whereby said ramp means may pivot upwardly and downwardly about the axis of said pivot means; wheeled suspension means for said ramp means engaging and movable along said track means and connected to said outer tunnel; drive means for telescopically moving said outer tunnel relative to said inner tunnel toward and away from said passageway; and elevating means incorporated in said suspension means for pivoting said ramp means upwardly and downwardly about the axis of said pivot means.

3. A track mounted, telescoping loading and unloading ramp as set forth in claim 2, wherein said passageway is rigidly connected to said track means.

4. A track mounted, telescoping loading and unloading ramp as defined in claim 2, including another wheeled suspension means engaging and movable along said track means and connected to said passageway, whereby said passageway and said ramp means may be moved along said track means as a unit.

5. In a track mounted, telescoping loading and unloading ramp, the combination of: a supporting structure; overhead track means carried by said supporting structure; a passageway suspended from said track means and including a first doorway facing in the direction of said track means, said passageway including a second doorway adapted to register with a doorway in a terminal building, or the like; telescoping ramp means below said track means and including an inner tunnel and an outer tunnel telescoped over said inner tunnel, said inner tunnel having an inner end in register with said first doorway; horizontal pivot means extending transversely of said track means adjacent the bottom of said first doorway and pivotally connecting said inner end of said inner tunnel to said passageway, whereby said ramp means may pivot upwardly and downwardly about the axis of said pivot means; wheeled suspension means for said ramp means engaging and movable along said track means and connected to said outer tunnel; drive means interconnecting said tunnels for telescopically moving said outer tunnel relative to said inner tunnel toward and away from said passageway; and elevating means incorporated in said suspension means for pivoting said ramp means upwardly and downwardly about the axis of said pivot means.

6. A track mounted, telescoping loading and unloading ramp as set forth in claim 5 wherein said drive means includes a driving member carried by said outer tunnel and includes a driven member engaging said driving member and carried by said inner tunnel and extending in the direction of said track means.

7. A track mounted, telescoping loading and unloading ramp as set forth in claim 5, wherein said elevating means includes two screw means connected to said outer tunnel at points spaced apart laterally of said track means.

References Cited in the file of this patent
UNITED STATES PATENTS

| | | |
|---|---|---|
| 1,882,512 | Lovejoy | Oct. 11, 1932 |
| 2,581,293 | Read et al. | Jan. 1, 1952 |
| 2,605,004 | Grueneberg | July 29, 1952 |
| 2,700,169 | Henion | Jan. 25, 1955 |